Sept. 9, 1941.  G. W. BECKER  2,255,146
VALVE STEM FOR INNER TUBES
Original Filed Oct. 11, 1933
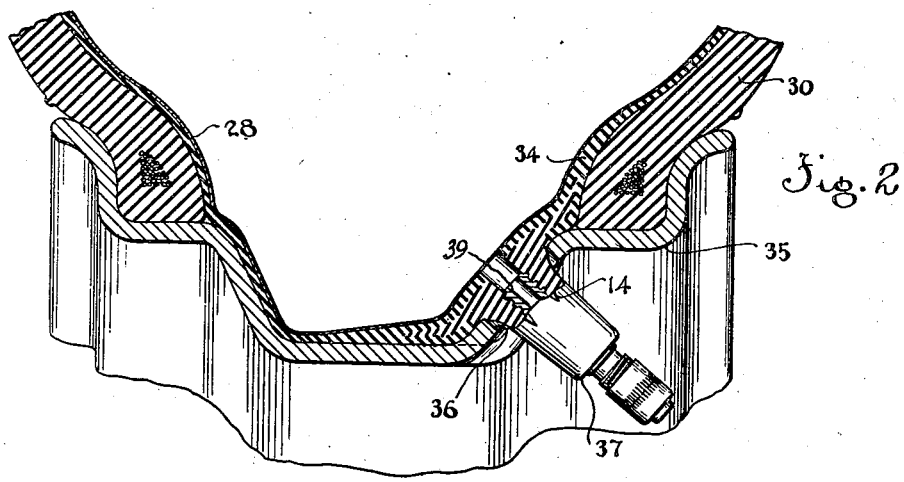
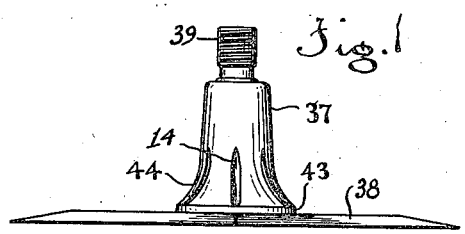
Inventor
George W. Becker
Attorney Patented Sept. 9, 1941

2,255,146

UNITED STATES PATENT OFFICE 2,255,146

VALVE STEM FOR INNER TUBES

George W. Becker, Silver Lake, Ohio, assignor, by mesne assignments, to The Dill Manufacturing Company, Cleveland, Ohio, a corporation of Ohio Original application October 11, 1933, Serial No. 693,114. Divided and this application July 31, 1937, Serial No. 156,831

2 Claims. (Cl. 152—430)

This invention relates to inner tubes for pneumatic tire casings, and more especially it relates to the inner tubes provided with rubber valve stems.

The chief object of the invention is to provide an improved valve stem for inner tubes of the character mentioned. More specifically the invention aims to provide a tube construction in which the valve stem may not readily be torn from the tube; which positively prevents leakage of air at the connection between valve stem and tube; and to provide a flexible rubber valve stem having a metal insert so arranged as to prevent distension of the rubber stem under pressure from within the inner tube.

This application is a division of my copending application Serial No. 693,114 filed October 11, 1933, now Patent No. 2,120,346.

Of the accompanying drawing:

Figure 1 is a side elevation of a rubber valve stem, in its preferred form, before it is incorporated in an inner tube; and Figure 2 is a fragmentary transverse section through a pneumatic tire and a rim in which it is mounted, there being an inner tube in the tire, and an improved rubber valve stem in the inner tube.

Referring to the drawing, the rubber valve stem 37 shown therein is provided with sufficient taper or draft to permit easy removal from the mold in which it is made. At its base it is formed with an integral terminal flange 38 preferably of rhombus or diamond shape, said flange having its marginal portion tapered or beveled substantially to a feather edge. At the juncture of the stem 37 and flange 38 is an annular shoulder or boss 43 that is concentric with the stem and of somewhat larger diameter than the latter, there being a substantial fillet or radius 44 where the stem joins said shoulder. The fillet 44 may be formed with a circumferential series of short, longitudinally disposed, shallow grooves 14, 14 if desired. The valve stem structure is partly or completely vulcanized before it is incorporated in a tube. Molded into the stem 37 and projecting from the end thereof remote from the terminal flange 38 is a tubular metal insert 39 for receiving the valve mechanism of the structure. The insert 39 extends substantially the full length of the rubber stem, but terminates just short of the terminal flange 38 thereon. The arrangement is such as to enable the valve stem to flex as a whole from its point of attachment in an inner tube, the insert also preventing distension of the rubber stem by reason of the inflation pressure within the tube.

As shown in Figure 2, an inner tube 34 is shown in inflated condition in a tire casing 30 that is mounted upon a drop center rim 35 that has a valve stem aperture 36 formed in one of the sidewalls of its central peripheral well or groove. The valve stem 37 of the inner tube is relatively short, and is disposed at an angle to the plane of the tube.

Preferably the interior surface of the tube 34 is treated with a composition 28, that seals the pores in the rubber of the tube and prevents the seepage of air therethrough. Such a composition is disclosed in the patent to Calvert, U. S. Patent No. 1,846,790.

Modification may be resorted to without departing from the spirit of the invention or the scope of the appended claims, which are not limited wholly to the specific construction shown or described.

What is claimed is:

1. An inner tube comprising an endless tube and an integral rubber valve stem, said rubber stem having a terminal base flange integrally attached to the outside of said tube to provide a reinforced region adjacent the valve stem, a tubular metal valve insert in said stem for receiving a valve mechanism wholly within said tubular insert, said metal insert being permanently united in the rubber stem by being molded therein having its innermost end of generally cylindrical shape and terminating substantially flush with the outer surface of said flange, whereby said stem, as a whole, is integrally united with said tube and relative flexing between the stem and the tube is substantially confined to the reinforced region at the base of the stem.

2. A combination inner tube and flexible rubber valve stem structure, said structure comprising a rubber valve stem having a base flange formed thereon and integrally attached to the outside of said tube, a tubular metal valve insert embedded in said rubber stem for receiving a valve mechanism wholly within said tubular insert, said metal insert having its innermost end of generally cylindrical shape and terminating in said stem short of said base flange but extending substantially to the adjacent inner tube surface whereby the exposed portion of said stem is rigid and the junction of the stem and inner tube in the region of said base flange is flexible, when positioned in a wheel assembly.

GEORGE W. BECKER.